(12) United States Patent
Lacey et al.

(10) Patent No.: US 7,174,065 B2
(45) Date of Patent: Feb. 6, 2007

(54) OPTICAL SWITCHING FABRIC WITH AN OPTICAL TO ELECTRICAL CONVERTER IN THE OUTPUT PLANE

(75) Inventors: Jonathan Lacey, Mountain View, CA (US); Julie Fouquet, Portola Valley, CA (US); Dale Schroeder, Scotts Valley, CA (US); Brian Lemoff, Union City, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 531 days.

(21) Appl. No.: 10/104,193

(22) Filed: Mar. 21, 2002

(65) Prior Publication Data

US 2003/0179983 A1   Sep. 25, 2003

(51) Int. Cl.
  *G02B 6/26* (2006.01)
(52) U.S. Cl. .................................................. 385/16
(58) Field of Classification Search ............. 385/16, 385/20, 31, 49, 52
See application file for complete search history.

(56) References Cited

U.S. PATENT DOCUMENTS

| | | | | |
|---|---|---|---|---|
| 5,239,598 | A | * | 8/1993 | Wight et al. ................. 385/8 |
| 5,512,907 | A | * | 4/1996 | Riza .......................... 342/375 |
| 5,798,580 | A | | 8/1998 | Morozov et al. |
| 6,167,170 | A | * | 12/2000 | Boffi et al. .................. 385/16 |
| 6,320,993 | B1 | | 11/2001 | Laor |
| 6,335,992 | B1 | | 1/2002 | Bala et al. |
| 6,344,912 | B1 | | 2/2002 | Hajjar et al. |
| 6,501,866 | B2 | | 12/2002 | Thomas |
| 6,539,142 | B2 | * | 3/2003 | Lemoff et al. ............... 385/18 |
| 6,760,502 | B2 | * | 7/2004 | Capik et al. ................. 385/17 |
| 2003/0128917 | A1 | * | 7/2003 | Turpin et al. ............... 385/24 |
| 2004/0179771 | A1 | | 9/2004 | Verhagen et al. |

FOREIGN PATENT DOCUMENTS

| | | |
|---|---|---|
| EP | 0 949 837 A2 | 10/1999 |
| WO | WO 01/90823 | 11/2001 |
| WO | WO 01/96924 | 12/2001 |
| WO | WO 01/96924 A1 | 12/2001 |

OTHER PUBLICATIONS

"Compact optical cross-connect switch based on total internal reflection in a fluid-containing planar lightwave circuit," by J. E. Fouquet, paper TuM1, Conference on Optical Fiber Communications, OFC 2000, Baltimore MD, USA, pp. 204-206.

(Continued)

*Primary Examiner*—Daniel Stcyr

(57) ABSTRACT

An optical switching fabric with an optical to electrical converter in the output plane. The optical switching fabric has an input plane with at least one input. The input plane provides at least a first optical signal (e.g., a first set of optical signals). The optical switching fabric has an output plane. The optical switching fabric has an interconnection mechanism for receiving the first set of optical signals and directing each received optical signal to a predetermined location in the output plane. The output plane has at least one optical to electrical converter (e.g., a plurality of optical to electrical converters) for receiving the directed optical signals and responsive thereto for generating a set of corresponding electronic output signals.

17 Claims, 5 Drawing Sheets

OTHER PUBLICATIONS

"1296-port MEMS transparent optical crossconnect with 2.07 Petabit/s switch capacity," by R. Ryf et al., paper PD28, Conference on Optical Fiber Communications, OFC 2001, Anaheim CA, USA.

"Holographic Optical Switchng: The ROSES Demonstrator," by W. A. Crossland, I. G. Manolis, M. M. Redmond, K. L. Tan, T. D. Wilkinson, M. J. Holmes, T. R. Parker, H. H. Chu, J. Croucher, V. A. Handerek, S. T. Warr, B. Robertson, I. G. Bonas, R. Franklin, C. Stace, H. J. White, R. A. Woolley, and G. Henshall, Journal of Lightwave Technology, vol. 18, No. 12, Dec. 2000, pp. 1845 to 1854.

\* cited by examiner

OPTICAL SWITCHING FABRIC WITH AN OPTICAL TO ELECTRICAL CONVERTER IN THE OUTPUT PLANE

FIELD OF THE INVENTION

The present invention relates generally to optical switches, and more particularly, to an optical switching fabric with an optical to electrical converter in the output plane.

BACKGROUND OF THE INVENTION

There are two major prior art approaches to switching or re-arranging the connections between high-bandwidth signals. These existing solutions include the use of optical-electrical-optical (OEO) switches and the use of pure optical switches.

Optical-Electronic-Optical (OEO) Approach

The optical-electronic-optical (OEO) approach converts incoming optical signals to electronic form, switches (i.e., rearranges) the signals electronically, and then converts the electrical signals back to optical form. The building blocks for such an approach are electronic crossbar switch integrated circuits (ICs), which are relatively inexpensive. However, the use of these electronic crossbar switch integrated circuits does have some disadvantages. First, the electronic crossbar switches have a limited capacity. The capacity is typically limited to the number of ports multiplied by the data rate per port. Second, the electronic crossbar switches consume significant amounts of power.

Moreover, high-capacity OEO switches typically require multi-stage networks because of the limited size of the building blocks. As can be appreciated, these multi-stage networks become physically large, consume large amounts of power, and once the networks reach a certain size require expensive optical interconnects between stages.

Consequently, at some capacity, the OEO switches lose viability and all-optical switches become attractive.

All-Optical Approach

An all-optical switch is a switch that has optical inputs, optical outputs, and no intermediate optical-electronic-optical conversion. One example of an all-optical switch is a crossbar optical switch. The publication entitled, "Compact optical cross-connect switch based on total internal reflection in a fluid-containing planar lightwave circuit," by J. E. Fouquet, paper TuM1, Conference on Optical Fiber Communications, OFC 2000, Baltimore Md., USA, pp. 204–206, describes the crossbar optical switch that employs a large number of very simple 1×2 and 2×2 switches. However, one significant disadvantage of the crossbar optical switch is that the optical loss scales linearly with the number of ports. Consequently, the crossbar optical switch is limited by the total number of ports required.

Another example of an all-optical switch is a "fan-out, fan-in" optical switch. The publication entitled, "1296-port MEMS transparent optical crossconnect with 2.07 Petabit/s switch capacity," by R. Ryf et al., paper PD28, Conference on Optical Fiber Communications, OFC 2001, Anaheim Calif., USA, describes an exemplary "fan-out, fan-in" optical switch. "Fan-out, fan-in" optical switches have a plurality of single mode fibers as inputs and a plurality of single mode fibers as outputs. A 1×N optical switch that is associated with each input directs light to the N×1 optical switch associated with the desired output. Typically, these "fan-out, fan-in" optical switches employ optics to perform the interconnection in free space.

One disadvantage of these types of optical switches is that very precise alignment of the optical system is required to steer beams of light from a single-mode fiber input to a single-mode fiber output with acceptable loss. First, the beams of light must be steered to hit a very small target area of a single mode fiber output. Second, not only must the light hit the small target area, but the light must also arrive at the target within a particular range of angles. If either of these two conditions is not met, the loss may become unacceptable.

For example, typically a very sophisticated closed-loop control is required to achieve and maintain the needed optical alignment. The closed-loop control has components, such as an optical source and coupler for each input port, an optical detector and splitter for each output port, and a sophisticated electronic signal processing circuit for each connection. As can be appreciated, the need for this sophisticated closed-loop control approach increases the complexity of switch design that may result in higher costs to manufacture the switch and that may pose reliability concerns.

Consequently, it is desirable for there to be a switching fabric for use in optical cross-connects that simplifies the optical system needed and relaxes the optical alignment requirements, thereby reducing the complexity and costs associated with the manufacture of such a switch.

Based on the foregoing, there remains a need for an optical switching fabric with an optical to electrical converter in the output plane that overcomes the disadvantages set forth previously.

SUMMARY OF THE INVENTION

According to one embodiment of the present invention, an optical switching fabric with at least one optical to electrical converter in the output plane is described. The optical switching fabric has an input plane that receives at least one input signal. The input plane provides at least a first optical signal (e.g., a first set of optical signals). The switching mechanism has an output plane. The optical switching fabric also has an interconnection mechanism for receiving the first set of optical signals and directing each received optical signal to a predetermined location in the output plane. The output plane has at least one optical to electrical converter (e.g., an array of photo-detectors) for receiving the directed optical signals and responsive thereto for generating a set of corresponding electronic output signals.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

An optical switching fabric with an optical to electrical converter in the output plane is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Optical Switching Fabric 100

Figure 1:
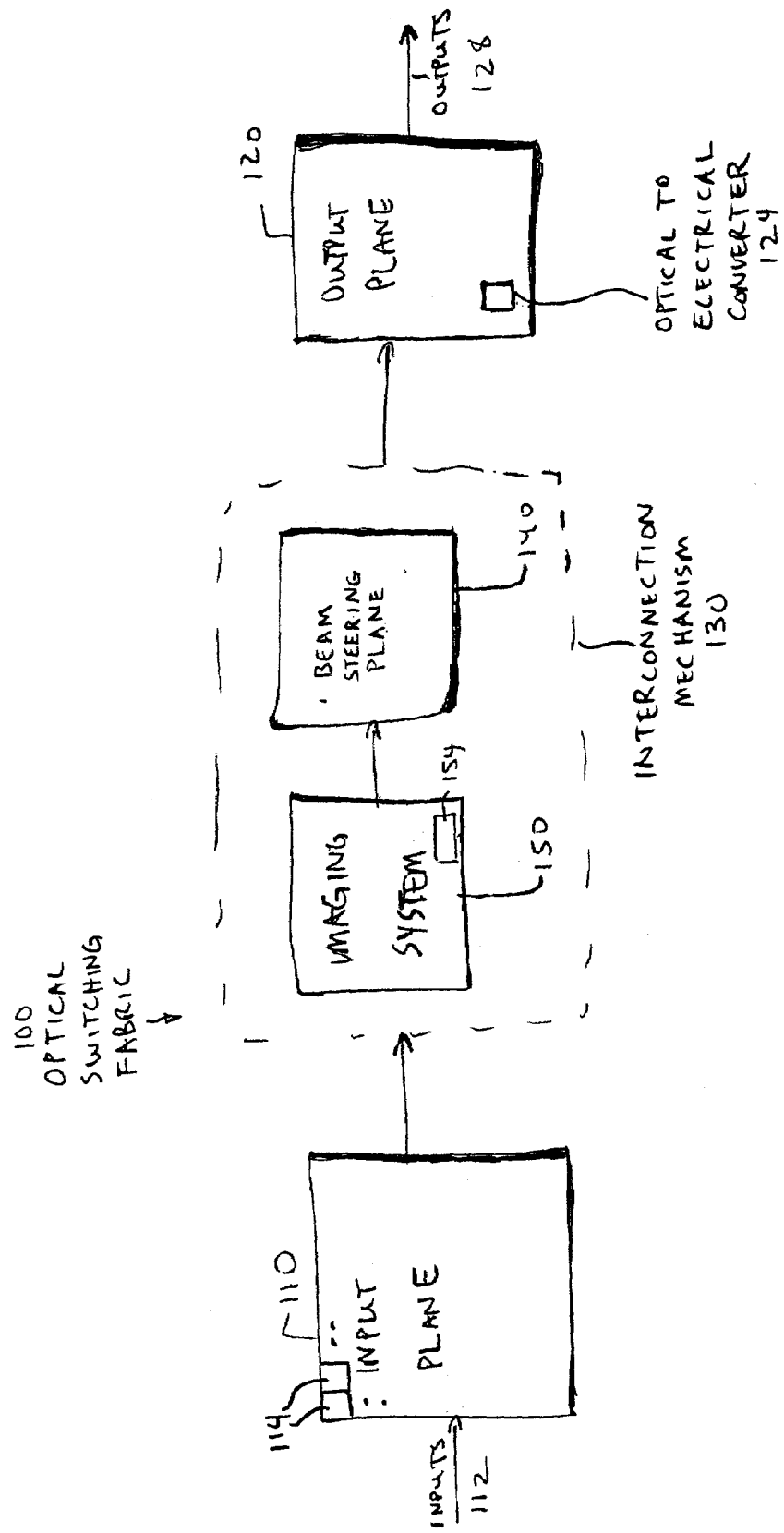
FIG. 1 is a block diagram illustrating an optical switching fabric according to one embodiment of the present invention.

FIG. 1 is a block diagram illustrating an optical switching fabric 100 according to one embodiment of the present invention. The optical switching fabric 100 routes one or more input channels to one or more corresponding output channels. The optical switching fabric 100 includes an input plane 110 for receiving at least one input (e.g., a plurality of inputs 112), an output plane 120 for generating at least one output (e.g., a plurality of outputs 128), and an interconnection mechanism 130 for switching the inputs 112 and the outputs 128 (i.e., for re-arranging the connections between the inputs 112 and the outputs 128).

For example, optical switching fabric 100 is suitable for selectively switching high-bandwidth signals (e.g., signals of the order of a gigabit per second or greater). The optical switching fabric 100 is also capable of high switching rates and is suitable for current applications that require reconfiguration times of the order of milliseconds.

The optical switching fabric 100 can be utilized in any optical cross-connects in which at least one incoming optical signal is converted to electronic form at least once in the optical switching fabric 100.

The output plane 120 includes at least one optical to electrical converter 124 (e.g., a photodetector). One aspect of the present invention is to provide an optical to electrical converter 124 in the output plane 120 instead of a single mode fiber. As compared to a single mode fiber, an optical to electrical converter 124 (e.g., a photodetector) in the output plane 120 has a larger target area and a greater angular tolerance for the light beams. Consequently, by utilizing optical to electrical converters 124 in the output plane 120, the number and complexity of the optical components required to steer light beams to the output plane 120, and specifically the optical to electrical converters in the output plane 120, are greatly reduced.

The interconnection mechanism 130 can be any means for interconnecting a first set of input signals (e.g., P input signals) and a first set of output signals (e.g., P output signals). It is noted that the inputs 112 may be optical or electronic, and the outputs 128 are electronic, but may be converted into optical signals as described in greater detail hereinafter. The interconnection mechanism 130 performs the interconnection by optically steering the optical signals propagating in free space. In this embodiment, the interconnection mechanism 130 includes an imaging system 150 and a beam steering plane 140.

The input plane 110 includes one or more input elements 114. The input plane 110 can be, for example, a one-dimensional array of input elements 114 or a two-dimensional (2D) array of input elements 114. Each input element 114 receives a corresponding input signal 112.

The input signals 112 can be electrical input signals or optical input signals. When the input signals 112 are electrical, the input plane 110 can include a plurality of optical sources (e.g., a one dimensional array of lasers or a two dimensional array of lasers) that generate optical signals in response to electrical signals as described in greater detail with reference to FIG. 2. For example, each input element can include a light source that generates a light beam in response to an electrical input signal.

When the inputs 112 are optical, the input plane can include a plurality of optical waveguides (e.g., a one dimensional array of optical fibers or a two dimensional array of optical fibers) that receive the optical signals as described in greater detail with reference to FIGS. 3 and 4. For example, each input element can include an optical fiber the provides a light beam for a particular input channel.

The output plane 120 includes one or more output elements. The output plane 120 can be, for example, a one-dimensional array of output elements or a two-dimensional (2D) array of output elements. In one embodiment, the output plane 120 includes a plurality of optical to electrical converters 224 for converting the steered optical signals into corresponding electrical signals. For example, each output element can include an optical to electrical converter. The optical to electrical converters 224 can be, for example, photodetectors.

The imaging system 150 can include a plurality of optical elements 250 (e.g., lenses, curved mirrors, etc.) for focusing or collimating the light beams generated by the input plane 110. For example, each optical signal leaving the input fiber or laser may have a corresponding optical element 250 for focusing the light beam onto a corresponding element in the beam steering plane 140. The imaging system 150 may include a plurality of lenses and/or mirrors that can be formed as part of an array. The purpose of the imaging system 150 is to image the input fiber or laser through the beamsteering element onto the desired photodetector in the output plane.

The imaging system 150 may include other optical elements 154 (e.g., additional lenses, mirrors, optics, etc.) to aid alignment or reduce the size of the optical system 150. These optical elements 154 may be shared between all input and outputs. An example of these optical elements 154 is a folding mirror or an imaging lens for manipulation of optical signals provided by the input plane 110.

It is noted that the inputs to the optical switching fabric 100 can be optical or electronic. If the inputs are electronic, the inputs are first converted to optical signals by employing lasers. The optical signals are then directed to photodetectors in the output plane. The output signals from the optical to electrical converters 124 are by definition electronic. For applications that require optical outputs, lasers can be utilized to convert the electrical output signals into optical output signals.

Optical Switching Fabric 200 with Electrical Inputs

Figure 2:
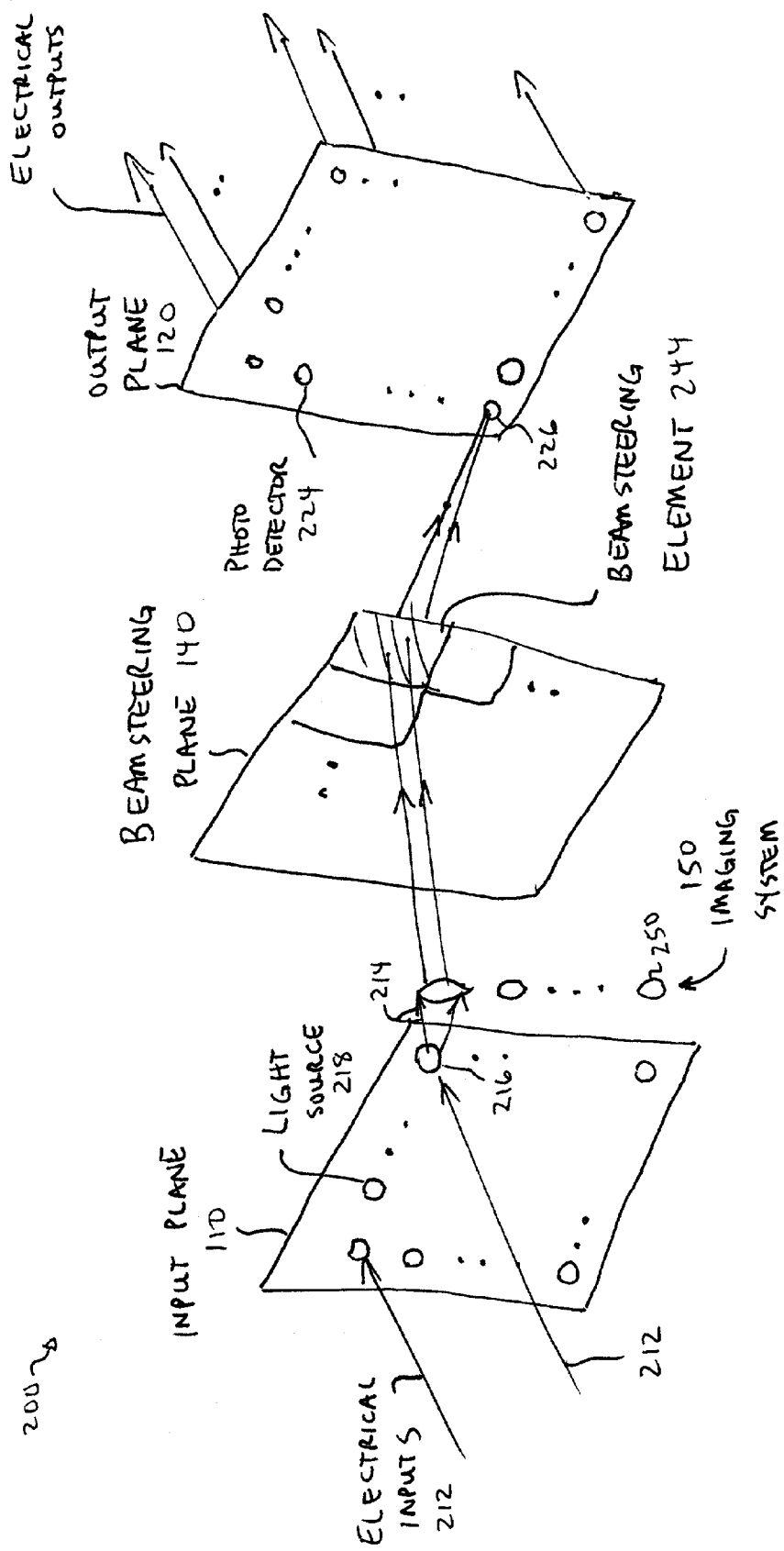
FIG. 2 illustrates an optical switching fabric with electrical inputs in accordance with a second embodiment of the present invention.

FIG. 2 illustrates an optical switching fabric 200 with electrical inputs 212 in accordance with a second embodiment of the present invention. When the inputs to the optical switching fabric 200 are electronic signals 212, each electronic signal is converted to a corresponding optical signal 214. One manner to perform this conversion is by using an optical source 218 (e.g., a light source) that is responsive to the electrical signal 212 to generate the corresponding optical signal 214. For example, each input element in the input plane can include a semiconductor laser for receiving the electrical signal and responsive thereto for generating a corresponding light signal. For example, the laser can use the electrical signal to modulate the optical output of the laser. The semiconductor laser can be, for example, a directly modulated vertical-cavity surface-emitting laser (VCSEL).

In one embodiment, the semiconductor lasers are arranged in a two-dimensional array (e.g., an N×M array of semiconductor lasers) so as to produce a two-dimensional array of optical signals that serve as the inputs to the interconnection mechanism 130. In this embodiment, the output plane 120 is a two-dimensional (2D) array of photodetectors 224 (e.g., an N×M array of photodetectors).

The beam steering plane 140 may be implemented with a two dimensional (2D) array of beamsteering elements 244 that directs light from each element 216 (e.g., optical source or optical fiber) in the input plane 110 to a predetermined element 226 in the output plane 120. The beamsteering element 244 may be a transmissive (e.g., a lens) or reflective (e.g., a mirror). Transmissive beamsteering elements are utilized in the switches illustrated in FIGS. 2 and 4 and described with reference thereto. Reflective beamsteering elements are utilized in the switch illustrated in FIG. 3 and described with reference thereto.

Each optical signal propagates through the switching fabric in free space. In one embodiment, the beamsteering plane 140 includes a beamsteering element for each optical input signal to steer the light from the input plane through space to arrive incident on a corresponding optical to electrical converter element in the output plane. For example, beamsteering element 244 corresponds to light source 216 and steers the light generated by the light source 216 and directs the light to a corresponding optical to electrical converter (e.g., photodetector 226) that is associated with a predetermined output channel. The beamsteering elements (e.g., element 244) can steer the beam in multiple dimensions (e.g., in two dimensions).

Figure 3:
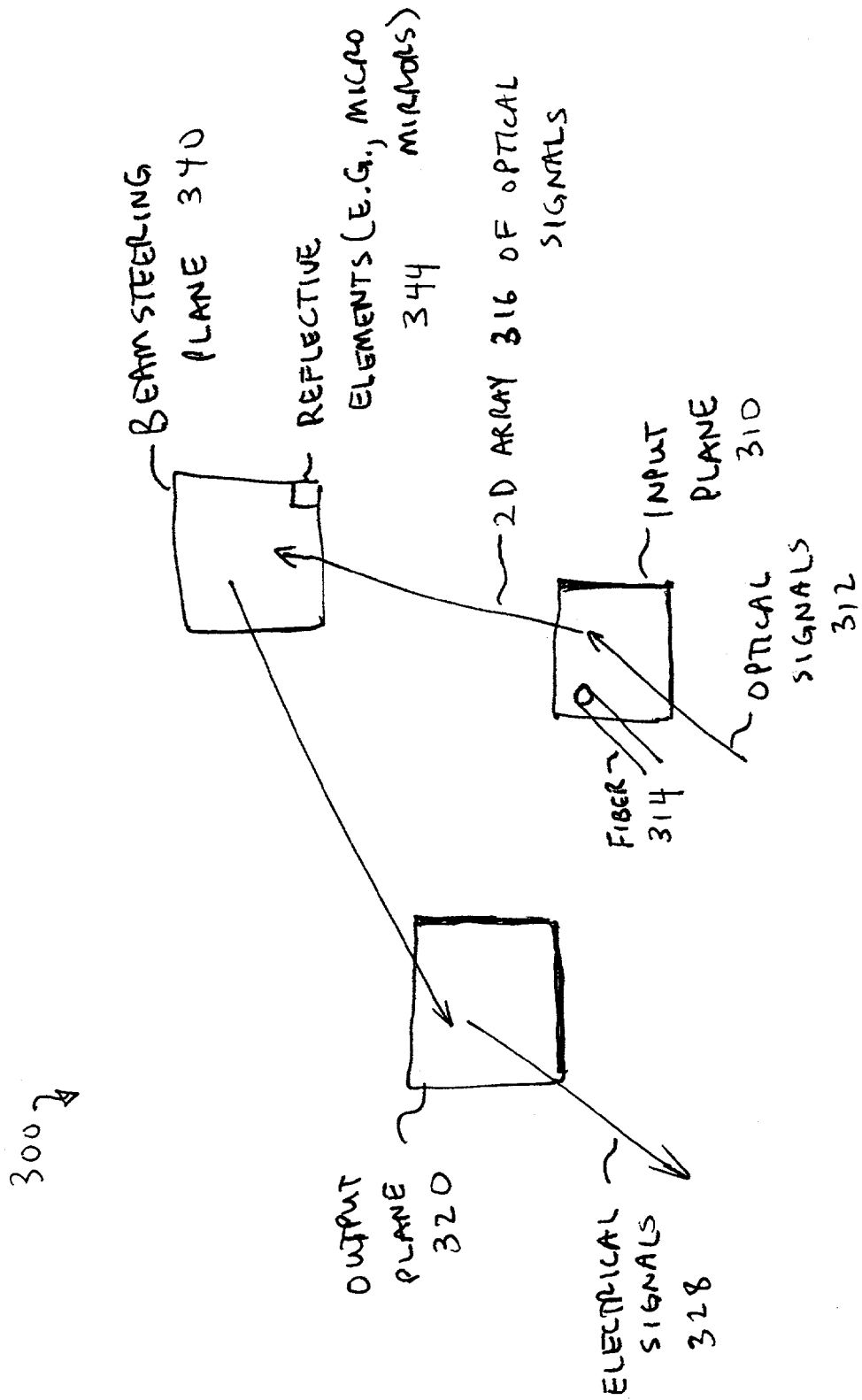
FIG. 3 illustrates an optical switching fabric with optical inputs that employs micro-mirror beamsteering elements in accordance with a third embodiment of the present invention.
Figure 4:
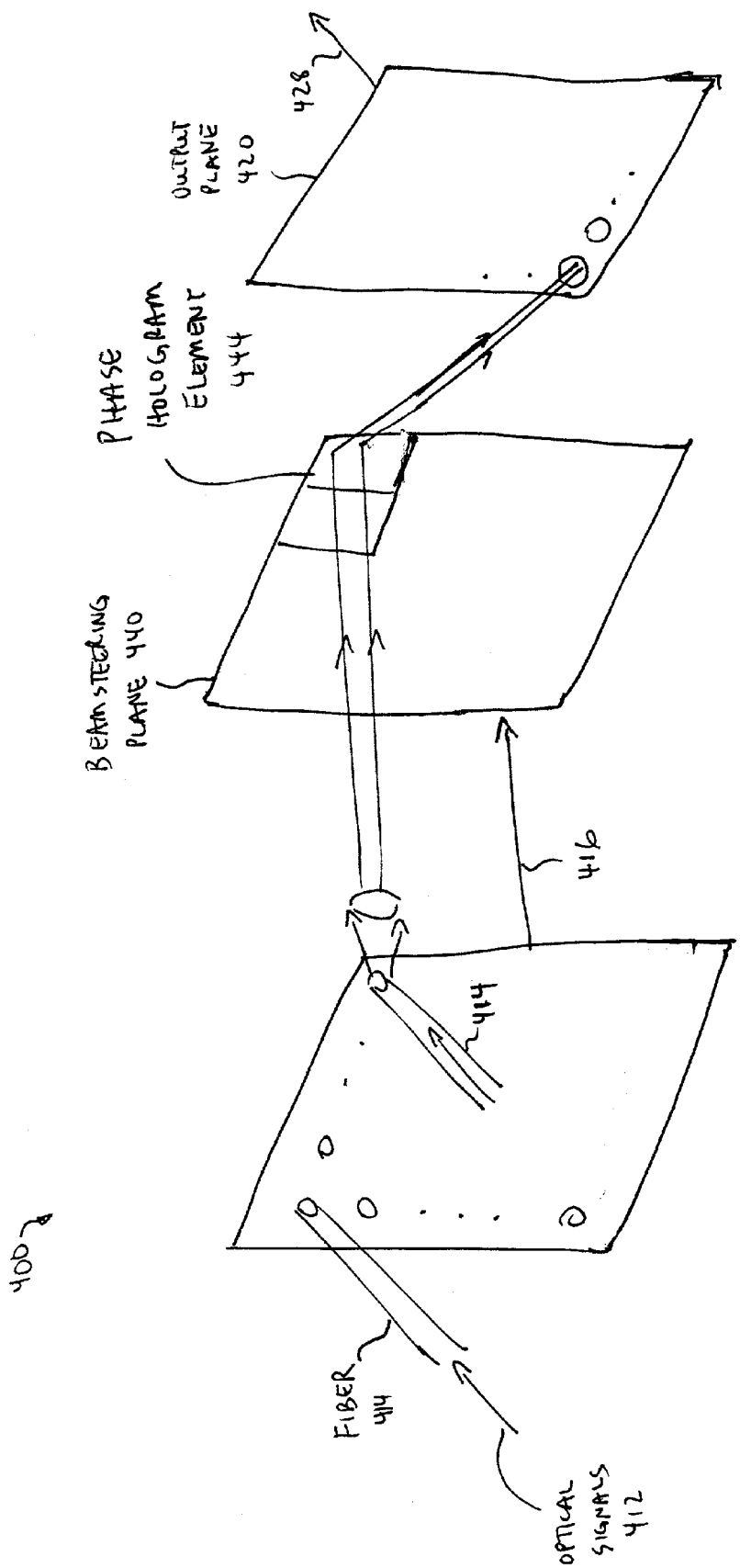
FIG. 4 illustrates an optical switching fabric with optical inputs that employs phase hologram beamsteering elements in accordance with a fourth embodiment of the present invention.

It is noted that the embodiments shown in FIGS. 2–4 utilize input planes, beamsteering planes, and output planes that are configured as two-dimensional array of elements (e.g., N×M arrays). However, it is noted that for the input planes, beamsteering planes, and output planes, either N or M can be 1 for some applications. Specifically, one or more of the input planes, beamsteering planes, and output planes can be arranged as a one-dimensional array (e.g., 1×M array or N×1 array) of elements (e.g., optical sources, optical to electrical converters, etc.).

Micro-Mirror Beamsteering Elements

FIG. 3 illustrates a optical switching fabric 300 with optical inputs 312 that employs micro-mirror beamsteering elements 344 in accordance with a third embodiment of the present invention. When the inputs to the optical switching fabric 300 are optical signals 312, these optical signals 312 can, for example, arrive on a plurality of optical fibers 314. The optical fibers 314 can be arranged in a two-dimensional array, so as to produce a two-dimensional array 316 of optical signals that serve as the inputs to the interconnection mechanism (e.g., the beamsteering plane 340). Each input optical fiber 314 carries a single wavelength.

As described earlier, an imaging system 150 can be provided between the input plane 310 and beamsteering plane 340, between the beamsteering plane 340 and the output plane 320, or between both sets of planes (310 and 340, 340 and 320). The imaging system 150 may be implemented with a microlens array and/or micromirrors. The micromirrors may be made non-flat to incorporate at least a portion of the imaging system 150 into the micromirror. The micromirrors may be manufactured with a silicon micromachining process.

The beamsteering plane 340 is provided that has a plurality of reflective beamsteering elements 344. The reflective beamsteering elements 344 that can be, for example, micromirrors that are manufactured by silicon micromachining. An output plane 320 receives the steering optical signals, converts the optical signals into corresponding electrical signals, and that provides the plurality of electrical output signals 328.

Phase Hologram Beamsteering Elements

FIG. 4 illustrates a optical switching fabric 400 with optical inputs that employs phase hologram beamsteering elements 444 in accordance with a fourth embodiment of the present invention. Similar to the switch of FIG. 3, the inputs to the optical switching fabric 400 are optical signals 412. These optical signals 412 can, for example, arrive on a plurality of optical fibers 414. The optical fibers 414 can be arranged in a two-dimensional array, so as to produce a two-dimensional array 416 of optical signals that serve as the inputs to the interconnection mechanism 130. Preferably, each input optical fiber 414 carries a single wavelength.

A beamsteering plane 440 is provided that has a plurality of beamsteering elements 444. The beamsteering elements 444 can be transmissive beamsteering elements (as shown in FIG. 4) or reflective beamsteering elements.

The beamsteering elements 444 can be implemented with, for example, switchable phase hologram elements. In such an embodiment, one hologram is associated with each input. The hologram elements can each direct a beam from a first input channel to an output channel. For example, each hologram steers its beam through free space to the desired location in the output plane. The hologram may also perform imaging. A publication entitled, "Holographic Optical Switching: The ROSES Demonstrator," by W. A. Crossland, I. G. Manolis, M. M. Redmond, K. L. Tan, T. D. Wilkinson, M. J. Holmes, T. R. Parker, H. H. Chu, J. Croucher, V. A. Handerek, S. T. Warr, B. Robertson, I. G. Bonas, R. Franklin, C. Stace, H. J. White, R. A. Woolley, and G. Henshall, Journal of Lightwave Technology, Vol. 18, No. 12, December 2000, pages 1845 to 1854, which is hereby incorporated by reference, describes in greater detail the construction and use of switchable phase holograms. An output plane 420 that generates a plurality of electrical output signals 428 is also provided.

By utilizing an optical core for performing the optical switching, the optical switching fabric of the present invention has a higher capacity than conventional OEO switches (e.g., scalable to higher capacities). Furthermore, the switch of the present invention is more compact than OEO switches and consumes less power.

In addition, the switch of the present invention is scalable to more ports than crossbar optical switches because optical loss does not increase linearly with number of ports for the switch of the present invention.

Furthermore, the switch of the present invention is simpler and less expensive than conventional optical switches for the following reasons. First, the optical switching fabric of the present invention employs an array of optical to electrical converters (e.g., photodetectors) instead of an array of fibers utilized by the prior art. As described earlier, photodetectors are insensitive to a first order to the incidence angle of the light the photodetectors detect. In contrast, single mode fibers have a small numerical aperture. Furthermore, a photodetector's active area may be larger than the core of a single mode fiber. For both these reasons, alignment tolerances are relaxed, and the required optical system is simplified for the optical switching fabric of the present invention.

Consequently, as compared to conventional optical switches that have single-mode fibers as outputs, the optical system required for the switch of the present invention has fewer elements (e.g., only one beamsteering array), has relaxed alignment tolerances (e.g., relaxed angular tolerances), and requires simpler control. Whereas the prior art optical switches typically have the need for very sophisticated closed-loop control to achieve and maintain the required optical alignment, the switch of the present invention needs either much simpler control or no control at all. Since sophisticated closed-loop control is expensive and raises reliability issues for prior art switches, the switch of the present invention obviates these expenses and reliability issues by employing optical to electrical converters in the output plane that require a simpler optical system and related control.

Applications of the Optical Switching Fabric of the Present Invention

One main application for the optical switching fabric of the present invention is in optical cross-connects. Optical cross-connects are elements used in optical telecommunications networks to provision (i.e., set up) new connections across the network, and to rearrange the network so as to mitigate the effects of equipment failures on existing connections. Optical cross-connects are described in greater detail hereinafter with reference to FIG. 5

Other applications that can utilize the switch of the present invention may include, but are not limited to, setting up new connections, protecting existing connections, restoring failed connections, and switching fabric functions in distributed routers, computers, and storage systems.

The electrical signals provided by the optical to electrical converters (e.g., photodetectors) may be utilized directly in certain applications. For example, the electrical signals can be provided as inputs to electronic switching and routing elements, such as an ATM switch, an IP router, or a SONET digital cross connect.

In other applications, the electrical signals provided by the optical to electrical converters (e.g., photodetectors) are first converted to optical signals and then utilized. For example, the optical signals can be launched into single mode fiber.

Exemplary Optical Telecommunications Network

Figure 5:
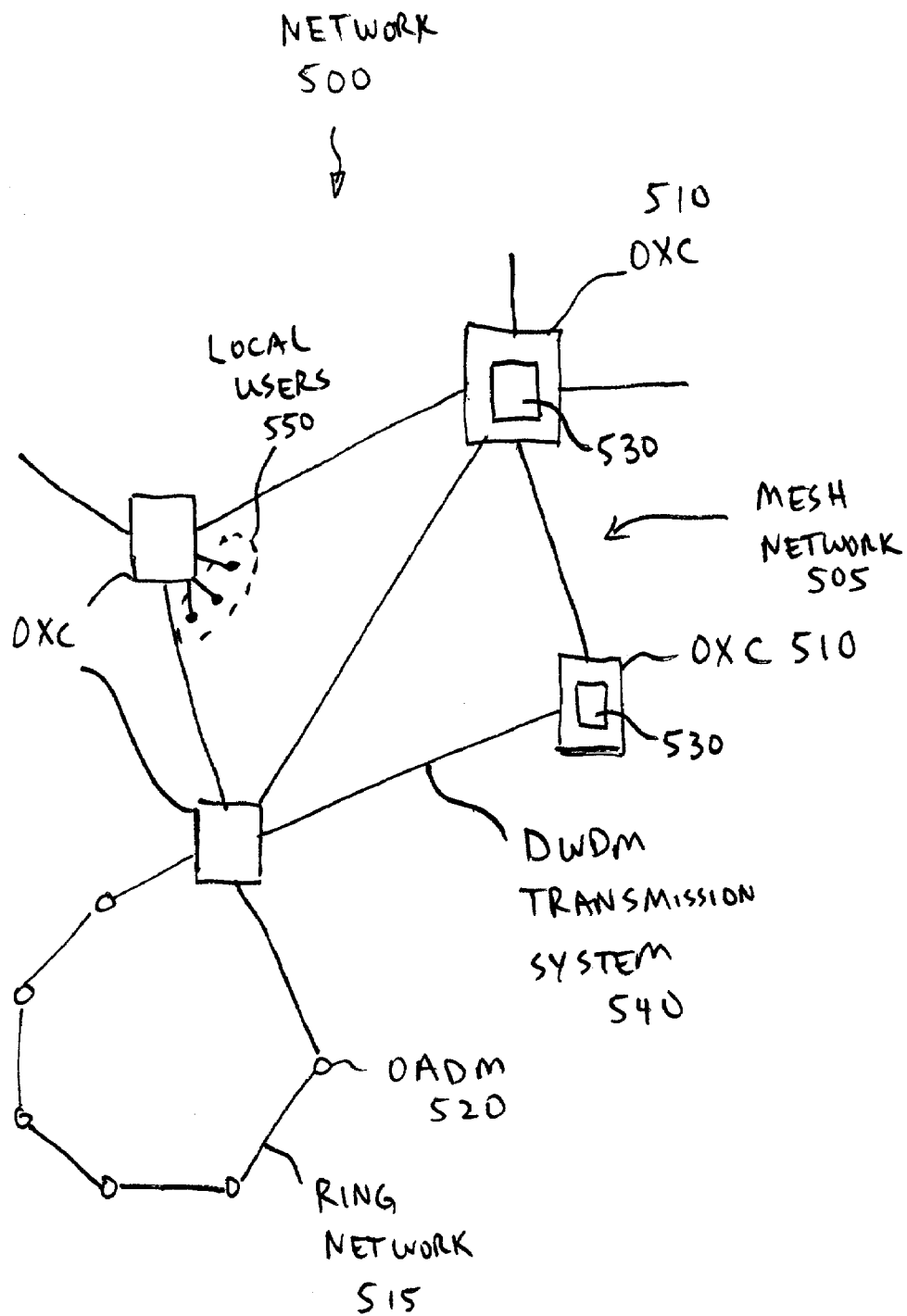
FIG. 5 illustrates an exemplary optical telecommunications network having an optical cross-connect in which the switch of the present invention can be implemented.

FIG. 5 illustrates an exemplary optical telecommunications network 500 having an optical cross-connects (OXCs) 510 in which the switch 530 of the present invention can be implemented. The network 500 includes a meshed optical network 505, in which each node is connected to more than two other nodes. The network 510 also includes Dense Wavelength Division Multiplexing (DWDM) transmission systems 540 that connect the nodes and carry many wavelengths. Each node in the meshed network 505 is an optical crossconnect (OXC) 510. At the OXC 510, the wavelengths are spatially separated, and each wavelength is dropped to local users 550 or switched to an outgoing DWDM system In an opaque network, built using opaque nodes, all wavelengths arriving at a node undergo optical-electrical-optical conversion at least once. This OEO conversion allows the signals to be regenerated, monitored bit-by-bit, and shifted in wavelength if necessary. The network 500 also includes a ring network 515, in which the nodes are a particular type of OXC called an optical add-drop multiplexer (OADM) 520. An OADM is an OXC connected to only two other nodes. The OADM 520 performs the same function as an OXC.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An optical switch comprising:
    a) an input plane for providing at least a first optical signal, wherein the input plane includes one of a one-dimensional array of vertical-cavity surface-emitting lasers (VCSELs) and a two dimensional array of vertical-cavity surface-emitting lasers (VCSELs);
    b) an output plane; and
    c) an interconnection mechanism for receiving the first optical signal and directing the first optical signal to a predetermined location in the output plane;
    wherein the output plane includes at least one optical to electrical converter for receiving the directed first optical signal and responsive thereto for generating a corresponding electronic output signal.

2. The optical switch of claim 1 wherein the interconnection mechanism further includes:
    a beamsteering plane having at least one beamsteering element for steering the first optical signal from the input plane through space to arrive incident on the optical to electrical converter in the output plane.

3. The optical switch of claim 2 further comprising:
    an imaging system for imaging the first optical signal through the beamsteering element onto the optical to electrical converter in the output plane.

4. The optical switch of claim 2 wherein the beamsteering element is a transmissive beamsteering element.

5. The optical switch of claim 4 wherein the transmissive beamsteering element is a mirror.

6. The optical switch of claim 2 wherein the beamsteering element is a reflective beamsteering element.

7. The optical switch of claim 6 wherein the reflective beamsteering element is a mirror.

8. The optical switch of claim 2 wherein the beamsteering element is a phase hologram beamsteering element.

9. The optical switch of claim 2 wherein the beamsteering element is a micro-mirror beamsteering element.

10. The optical switch of claim 1 wherein the input plane is coupled to one of a one-dimensional array of optical fibers and a two-dimensional array of optical fibers.

11. The optical switch of claim 1 wherein the output plane includes one of a one-dimensional array of photo detectors and a two dimensional array of photodetectors.

12. The optical switch of claim 1 wherein the input plane receives a plurality of inputs that includes one of a plurality of electrical input signals and a plurality of optical input signals.

13. The optical switch of claim 1 wherein the output plane generates a plurality of output signals that includes a plurality of electrical output signals.

14. An optical switching fabric comprising:
    a) an input plane for receiving a plurality of inputs and responsive thereto for generating a first set of optical signals, wherein the input plane includes one of a one-dimensional array of vertical-cavity surface emitting lasers (VCSELs) and a two-dimensional array of vertical-cavity surface emitting lasers (VCSELs);

b) an output plane; and
c) an interconnection mechanism having an optical switching fabric for receiving a first set of optical signals and directing each of the optical signals to a predetermined location in the output plane;
wherein the output plane includes a plurality of optical to electrical converters for receiving the directed set of optical signals and responsive thereto for generating a set of corresponding electronic output signals.

15. The optical switching fabric of claim 14 wherein the interconnection mechanism further includes:
a beamsteering plane having a plurality of beamsteering elements for steering the first set of optical signals from the input plane through space to arrive incident on corresponding optical to electrical converters in the output plane.

16. The optical switching fabric of claim 15 wherein the optical switching fabric further comprises:

an imaging system for imaging the first set of signals through corresponding beamsteering elements onto corresponding optical to electrical converters in the output plane.

17. A method for switching an optical signal in an optical switching fabric that includes an output plane including at least one optical to electrical converter and an input plane including one of a one-dimensional array of vertical-cavity surface emitting lasers (VCSELs) and a two-dimensional array of vertical-cavity surface emitting lasers (VCSELs), the method comprising:
a) receiving an optical signal;
b) directing the optical signal to the optical to electrical converter in the output plane; and
c) converting the optical signal into a corresponding electrical signal.

* * * * *